(12) United States Patent
Malleshaiah et al.

(10) Patent No.: US 12,438,785 B2
(45) Date of Patent: Oct. 7, 2025

(54) ADVANCED MACHINE LEARNING TECHNIQUES FOR INTERNET OUTAGE DETECTION

(71) Applicant: Zscaler, Inc., San Jose, CA (US)

(72) Inventors: Prasannakumar Jobigenahally Malleshaiah, San Jose, CA (US); Alexander Frazier, San Jose, CA (US); Chakkaravarthy Periyasamy Balaiah, San Jose, CA (US); Javier Rodriguez Gonzalez, San Jose, CA (US); Ashok Kolachina, Milpitas, CA (US); Sanjit Ganguli, Great Falls, VA (US)

(73) Assignee: Zscaler, Inc., San Jose, CA (US)

( * ) Notice: Subject to any disclaimer, the term of this patent is extended or adjusted under 35 U.S.C. 154(b) by 5 days.

(21) Appl. No.: 17/829,618

(22) Filed: Jun. 1, 2022

(65) Prior Publication Data
US 2023/0396512 A1    Dec. 7, 2023

(51) Int. Cl.
| | |
|---|---|
| *H04L 41/16* | (2022.01) |
| *H04L 9/40* | (2022.01) |
| *H04L 41/147* | (2022.01) |
| *H04L 43/10* | (2022.01) |
| *H04Q 9/00* | (2006.01) |

(52) U.S. Cl.
CPC ............ *H04L 41/16* (2013.01); *H04L 41/147* (2013.01); *H04L 43/10* (2013.01); *H04L 63/0227* (2013.01); *H04Q 9/00* (2013.01)

(58) Field of Classification Search
CPC ....... H04Q 9/00; H04L 63/0227; H04L 43/10; H04L 41/147; H04L 41/16
See application file for complete search history.

(56) References Cited

U.S. PATENT DOCUMENTS

| | | |
|---|---|---|
| 8,464,335 B1 | 6/2013 | Sinha et al. |
| 8,495,737 B2 | 7/2013 | Sinha et al. |
| 8,955,091 B2 | 2/2015 | Kailash et al. |
| 9,060,239 B1 | 6/2015 | Sinha et al. |
| 9,369,433 B1 | 6/2016 | Paul et al. |
| 9,473,537 B2 | 10/2016 | Sinha et al. |
| 10,728,113 B2 | 7/2020 | Sinha et al. |
| 10,728,117 B1 | 7/2020 | Sharma et al. |
| 2002/0177910 A1* | 11/2002 | Quarterman ............ H04L 45/00 700/28 |

(Continued)

*Primary Examiner* — Thomas J Dailey
(74) *Attorney, Agent, or Firm* — Baratta Law PLLC; Lawrence A. Baratta, Jr.

(57) ABSTRACT

The present systems and methods provide a user performance monitoring solution that enables the monitoring of application and device performance from the end user's point of view. The present systems and methods help Information Technology (IT) personnel to ensure the quality of digital experience across the enterprise. The present system is adapted to collect telemetry data from devices relative to the performance of all tiers of Internet Service Providers (ISPs), create a baseline of the performance of the ISPs based on a plurality of metrics and the collected telemetry data, train a Machine Learning (ML) model to assess blackout and brownout prediction accuracy at different performance values for the metrics, and identify a blackout or brownout, wherein a blackout or brownout is identified when real time performance is worse than the performance values identified by the model.

20 Claims, 10 Drawing Sheets

(56) References Cited

U.S. PATENT DOCUMENTS

| | | |
|---|---|---|
| 2011/0277027 A1 | 11/2011 | Hayton et al. |
| 2012/0304244 A1 | 11/2012 | Xie et al. |
| 2013/0311832 A1 | 11/2013 | Lad et al. |
| 2013/0322258 A1 | 12/2013 | Nedeltchev et al. |
| 2014/0164585 A1* | 6/2014 | Shaw .................. H04L 41/5012 |
| | | 709/223 |
| 2014/0321315 A1 | 10/2014 | Akhter et al. |
| 2015/0195291 A1 | 7/2015 | Zuk et al. |
| 2015/0326613 A1 | 11/2015 | Devarajan et al. |
| 2017/0210731 A1 | 7/2017 | Kumar et al. |
| 2017/0250887 A1 | 8/2017 | Sadana et al. |
| 2017/0315902 A1 | 11/2017 | Moretto et al. |
| 2017/0366421 A1 | 12/2017 | Dam et al. |
| 2018/0167312 A1* | 6/2018 | Liu ......................... H04L 45/22 |
| 2020/0274782 A1 | 8/2020 | Balaiah et al. |
| 2020/0274783 A1 | 8/2020 | Sharma et al. |
| 2020/0274784 A1 | 8/2020 | Sharma et al. |
| 2021/0029119 A1* | 1/2021 | Raman ................ H04L 67/1001 |
| 2022/0278889 A1* | 9/2022 | Malleshaiah ....... H04L 41/0631 |

* cited by examiner

ADVANCED MACHINE LEARNING TECHNIQUES FOR INTERNET OUTAGE DETECTION

FIELD OF THE DISCLOSURE

The present disclosure relates generally to networking and computing. More particularly, the present disclosure relates to systems and methods for detecting the magnitude of internet outages.

BACKGROUND OF THE DISCLOSURE

The identification and monitoring of internet outages is an increasingly complex issue as Internet Service Providers (ISP's) network architectures are extremely complex with peering relationships and hand-offs at various points. Currently, service issues such as blackouts or brownouts are detected through self-reporting by the affected users through social media (and other messaging platforms), or through specialized sites. However, this approach is not effective, as the majority of the blackouts and brownouts are not reported, and even if they are reported, it is difficult to estimate the scale and magnitude in terms of number of users, start and end times, and resulting financial, economic, and security impact. Detecting the extent of ISP outage and answering various questions such as when did a particular incident start or end, and which users is the incident affecting is a hard problem as the underlying network architecture is very complex, involving infrastructure from many organizations from last mile internet providers to backbone providers. The present disclosure provides an idea to solve the problem through using telemetry collected across millions of devices across various locations with coverage across all kinds of internet service providers. The present systems and methods provide a user performance monitoring solution that enables the monitoring of application and device performance from the end user's point of view, helping to ensure the quality of digital experience across the enterprise. Main factors affecting a user's experience include ISP performance issues which can cause black outs, brownouts, and increased latency among other factors.

BRIEF SUMMARY OF THE DISCLOSURE

The present disclosure relates to systems and methods for detecting the magnitude of internet outages. The present system is a user performance monitoring (or end user experience monitoring) solution that enables the monitoring of application and device performance from the end user's point of view. The present systems and methods help Information Technology (IT) personnel to ensure the quality of digital experience across the enterprise. A score (for example, 0 to 100) is a measure of a users performance, 0 being the worst and 100 the best. It is computed using telemetry collected from end user devices after normalizing to the users peer group. A lower score may be due to performance degradation in one or more devices/hops from a user's device to a destination application. One of the main factors that affects a user's score is Internet Service Provider (ISP) performance issues such as blackouts, brownouts, increased latency, etc. Detection (or estimation) helps the organization in answering questions, which will be of immense value in terms of planning, budgeting, choosing internet providers, and more. The present disclosure provides a solution to the problem by using telemetry collected across millions of devices throughout various locations with coverage across all kinds of internet service providers.

In an embodiment a non-transitory computer-readable medium including instructions that, when executed, cause a processor to collect telemetry data from devices relative to the performance of all tiers of Internet Service Providers (ISPs); create a baseline of the performance of the ISPs based on a plurality of metrics and the collected telemetry data; and train a Machine Learning (ML) model to assess blackout and brownout prediction accuracy at different performance values for the metrics. Additionally, identify a blackout or brownout, wherein a blackout or brownout is identified when real time performance is worse than the performance values identified by the model. The telemetry data includes traceroutes to popular destinations. The traceroutes are performed between data centers set up at strategic locations. The various metrics include Page Fetch Time (PFT), Time To First Byte (TTFB), probe error rates, latency, packet drops, and route stability. A magnitude of the blackout or brownout is calculated as a function of the telemetry signals along with external data. The magnitude of the blackout or brownout may be represented in graphical form. A blackout or brownout that affects a small group of people is considered low impact and is related to user to access point ISP issues, and an outage that affects a large number of users is considered more significant, and related to a backbone ISP incident. Baseline metrics are computed periodically, where the periods may be daily, weekly, or any longer or shorter time period. Blackouts and brownouts are detected by computing the distance of current metrics from baselines. Once a blackout or brownout is detected, to identify choke points within a network, ISP outage detectors will cluster latency and probe-errors based on different hops and ISPs within the network.

In another embodiment, a method implemented external to a network edge and located external from one of a computer device and a mobile device associated with a user, the method including steps of: collecting telemetry data from devices relative to the performance of all tiers of Internet Service Providers (ISPs); creating a baseline of the performance of the ISPs based on a plurality of metrics and the collected telemetry data; and training a Machine Learning (ML) model to assess blackout and brownout prediction accuracy at different performance values for the metrics. Additionally, identifying a blackout or brownout, wherein a blackout or brownout is identified when real time performance is worse than the performance values identified by the model. The telemetry data includes traceroutes to popular destinations. The traceroutes are performed between data centers set up at strategic locations. The various metrics include Page Fetch Time (PFT), Time To First Byte (TTFB), probe error rates, latency, packet drops, and route stability. A magnitude of the blackout or brownout is calculated as a function of the telemetry signals along with external data. The magnitude of the blackout or brownout may be represented in graphical form. A blackout or brownout that affects a small group of people is considered low impact and is related to user to access point ISP issues, and an outage that affects a large number of users is considered more significant, and related to a backbone ISP incident. Baseline metrics are computed periodically, where the periods may be daily, weekly, or any longer or shorter time period. Blackouts and brownouts are detected by computing the distance of current metrics from baselines. Once a blackout or brownout is detected, to identify choke points within a network, ISP outage detectors will cluster latency and probe-errors based on different hops and ISPs within the network.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

DETAILED DESCRIPTION OF THE DISCLOSURE

Again, the present disclosure relates to systems and methods for detecting the magnitude of internet outages. The present system is a user performance monitoring (or end user experience monitoring) solution that enables the monitoring of application and device performance from the end user's point of view. The present systems and methods help Information Technology (IT) personnel to ensure the quality of digital experience across the enterprise. A score (for example, 0 to 100) is a measure of a users performance, 0 being the worst and 100 the best. It is computed using telemetry collected from end user devices after normalizing to the users peer group. A lower score may be due to performance degradation in one or more devices/hops from a user's device to a destination application. One of the main factors that affects a user's score is Internet Service Provider (ISP) performance issues such as blackouts, brownouts, increased latency, etc. Detection (or estimation) helps the organization in answering questions, which will be of immense value in terms of planning, budgeting, choosing internet providers, and more. The present disclosure provides a solution to the problem by using telemetry collected across millions of devices throughout various locations with coverage across all kinds of internet service providers.

§ 1.0 Example Cloud-Based System Architecture

Figure 1:
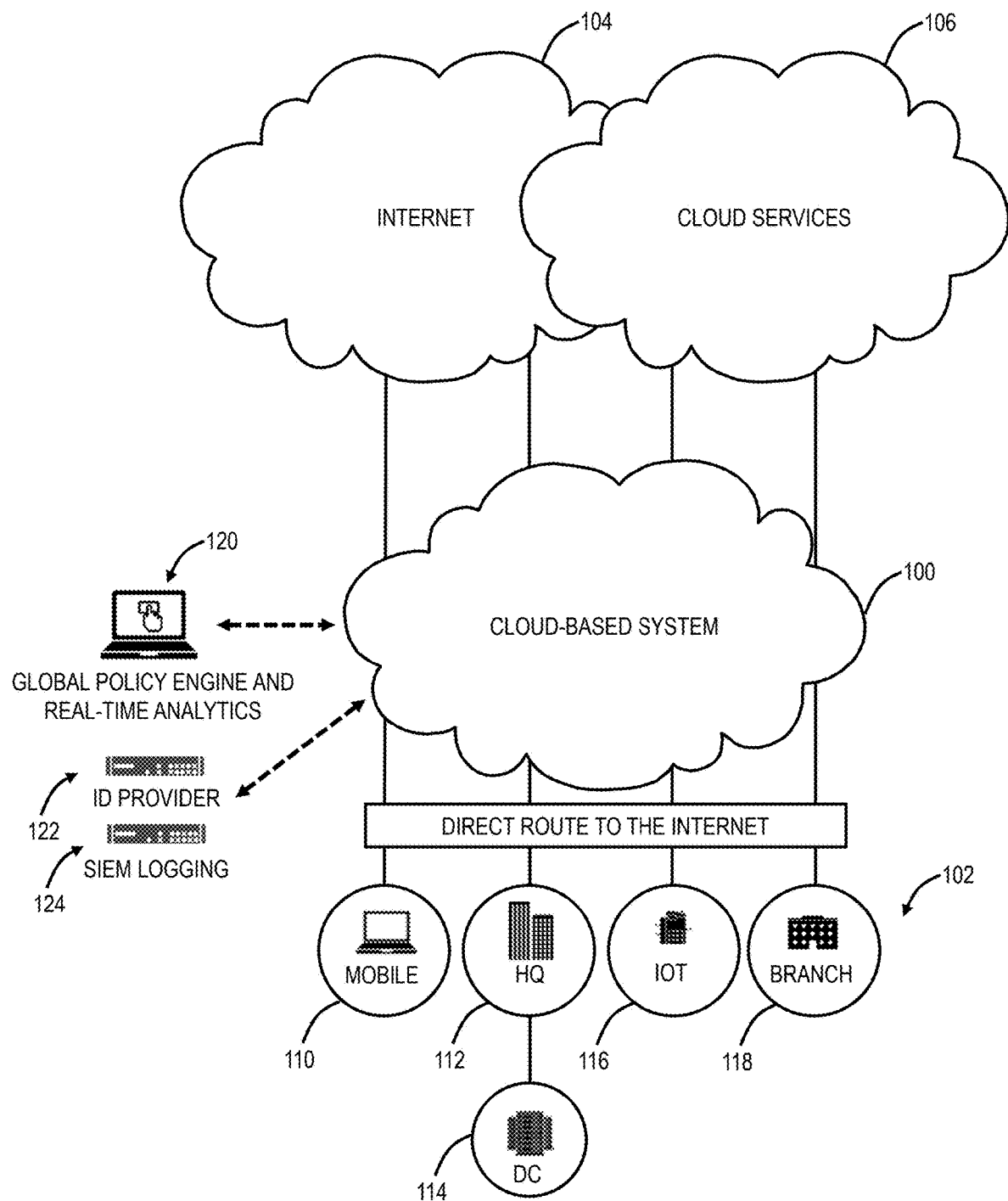
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. Threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

The cloud-based system 100 can provide other security functions, including, for example, micro-segmentation, workload segmentation, API security, Cloud Security Posture Management (CSPM), user identity management, and the like. That is, the cloud-based system 100 provides a network architecture that enables delivery of any cloud-based security service, including emerging frameworks.

Figure 5:
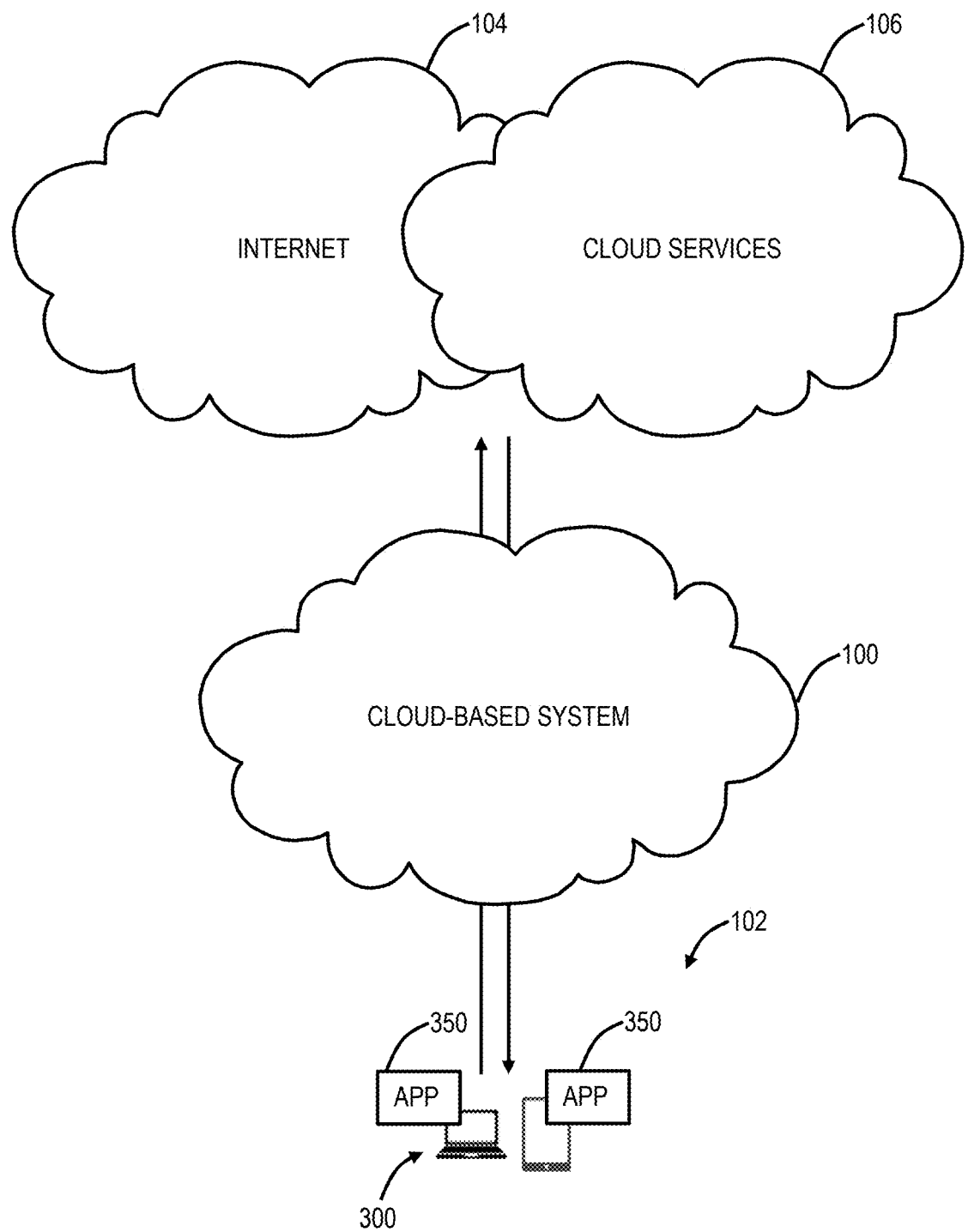
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 (User Equipment (UE)) is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
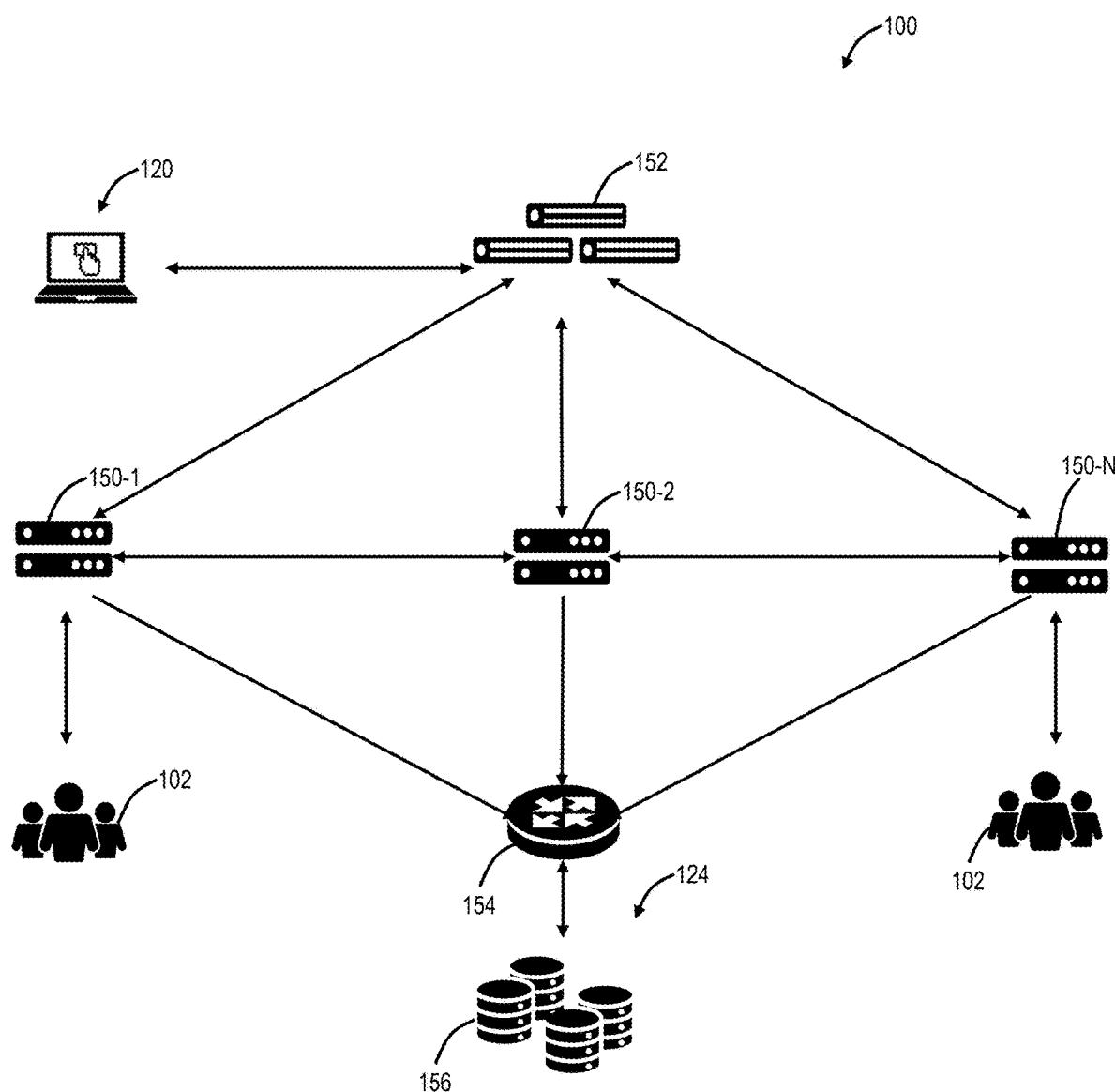
FIG. 2 is a network diagram of an example implementation of the cloud-based system.
Figure 4:
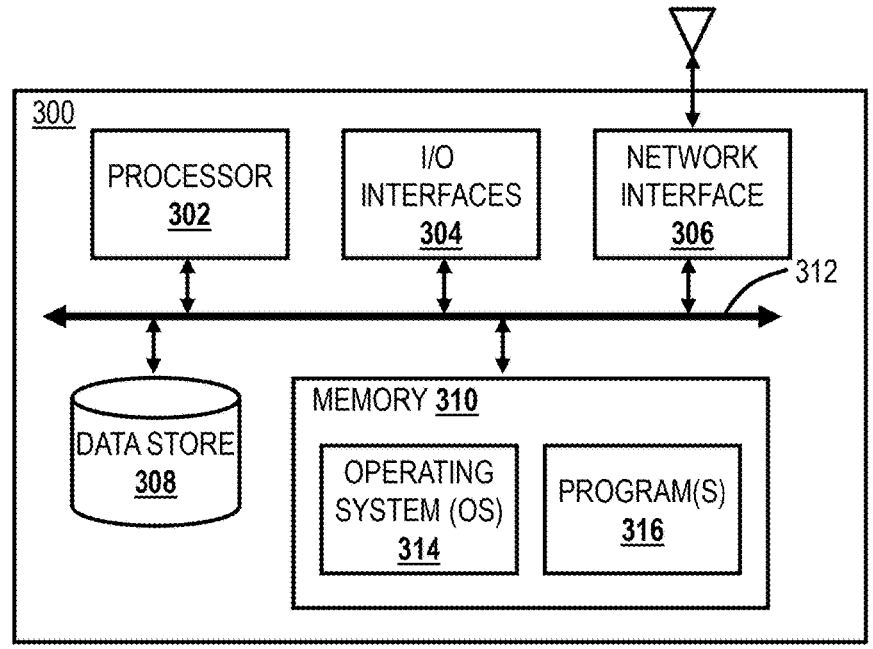

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforement" nodes 150 but they can be simply referred to as nodes 150 in the cloud-based system 100. Also, the nodes 150 can be referred to as service edges. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from the tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement nodes 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 1.1 Private Nodes Hosted by Tenants or Service Providers

The nodes 150 that service multi-tenant users 102 may be located in data centers. These nodes 150 can be referred to as public nodes 150 or public service edges. In embodiment, the nodes 150 can be located on-premises with tenants (enterprise) as well as service providers. These nodes can be referred to as private nodes 150 or private service edges. In operation, these private nodes 150 can perform the same functions as the public nodes 150, can communicate with the central authority 152, and the like. In fact, the private nodes 150 can be considered in the same cloud-based system 100 as the public nodes 150, except located on-premises. When a private node 150 is located in an enterprise network, the private node 150 can have a single tenant corresponding to the enterprise; of course, the cloud-based system 100 is still multi-tenant, but these particular nodes are serving only a single tenant. When a private node 150 is located in a service provider's network, the private node 150 can be multi-tenant for customers of the service provider. Those skilled in the art will recognize various architectural approaches are contemplated. The cloud-based system 100 is a logical construct providing a security service.

§ 2.0 User Device Application for Traffic Forwarding and Monitoring

Figure 3:
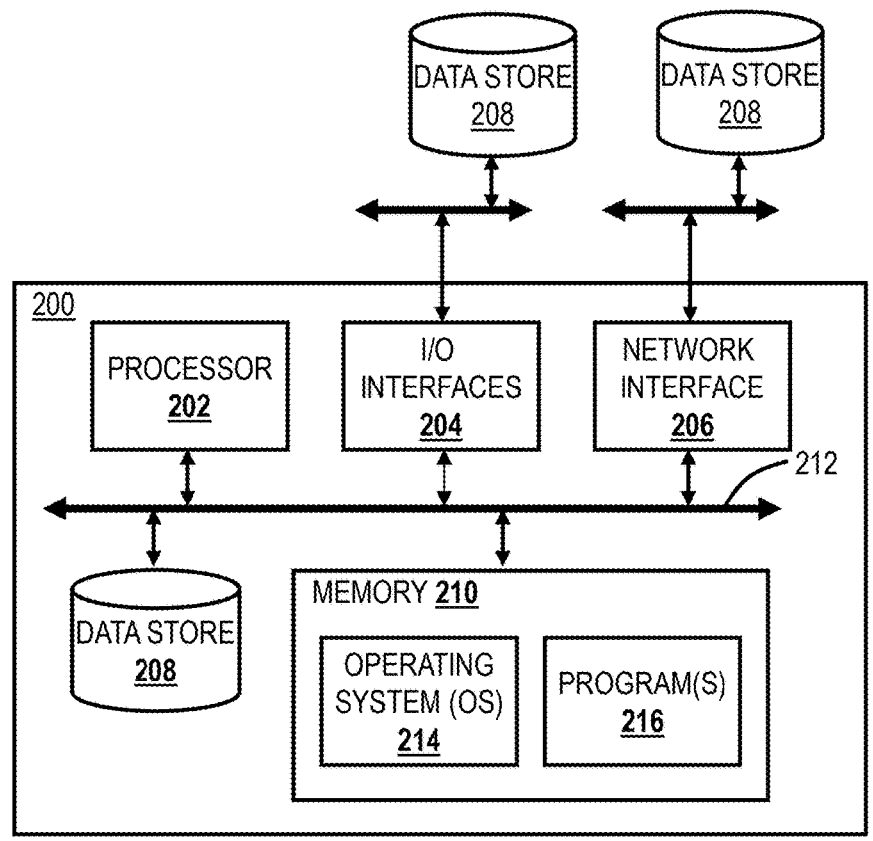

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 3.0 Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 5.0 Zero Trust Network Access Using the Cloud-Based System

Figure 6:
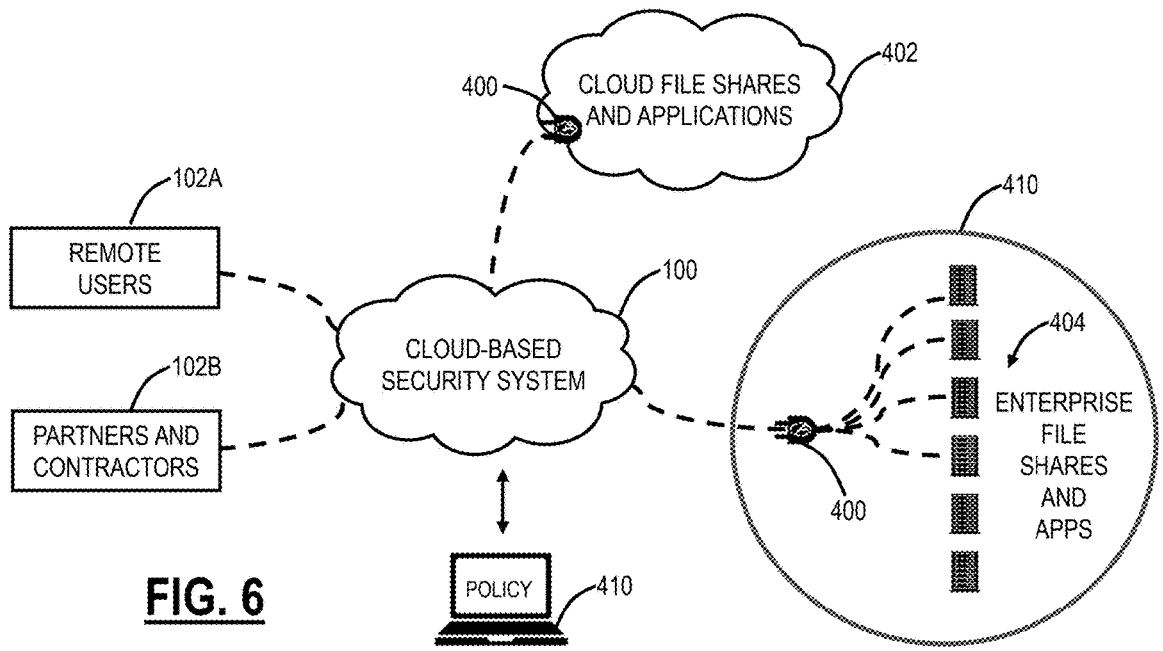
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 7:
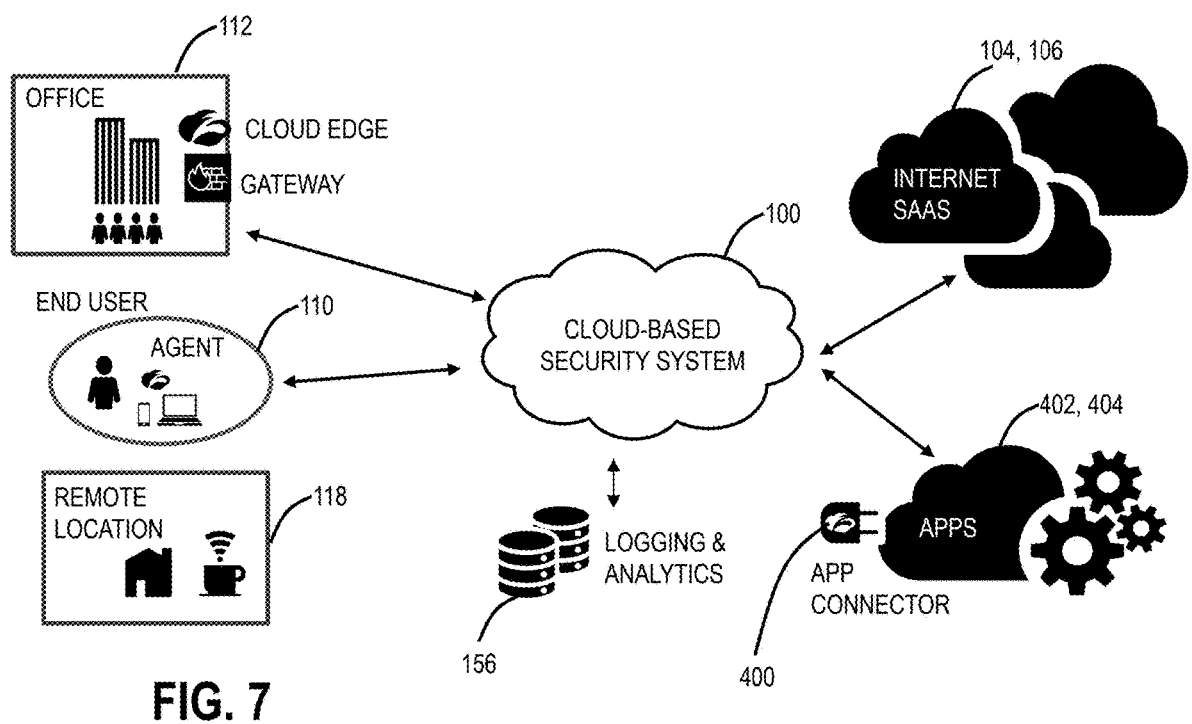
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

| Application-related data | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

| Network-related data | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| Device-related data (endpoint-related data) | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an in-line transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 Internet Outage Detection

Figure 8:
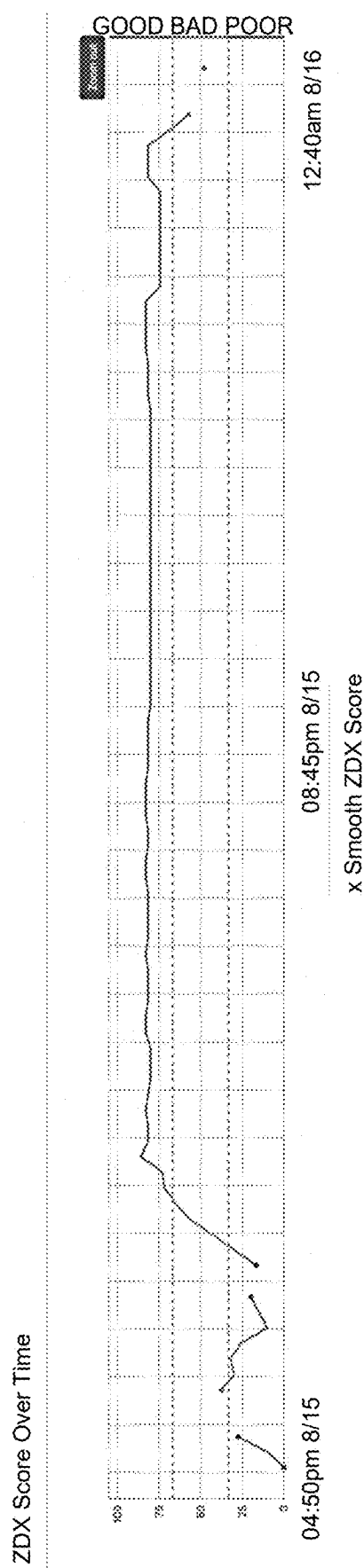
FIG. 8 is a graph representing the score assigned to a user/device over a period of time.

Again, the present disclosure relates to systems and methods for detecting internet outages and the magnitude thereof. The present system is a user performance monitoring (or end user experience monitoring) solution that enables the monitoring of application and device performance from the end user's point of view. The present systems and methods help Information Technology (IT) personnel to ensure the quality of digital experience across an enterprise. A score (for example, 0 to 100) is a measure of a user's performance, 0 being the worst and 100 the best. It is computed using telemetry collected from end user devices after normalizing to the user's peer group. A lower score may be due to performance degradation in one or more devices/hops from a user's device to a destination application. One of the main factors that affects a user's score is Internet Service Provider (ISP) performance issues such as blackouts, brownouts, increased latency, etc. Detection (or estimation) helps the organization in answering questions, which will be of immense value in terms of planning, budgeting, choosing internet providers, and more. The present disclosure provides a solution to the problem by using telemetry collected across millions of devices throughout various locations with coverage across all kinds of internet service providers. An example of the score pattern is shown in the graph of FIG. 8, the score pattern is shown as the user's performance over a period of time.

The system and methods of the present disclosure detect many factors which can affect a user's experience. One of the main factors which affects a user's experience, thus affecting a user's score, is ISP performance issues. The detection of these factors can help the organization to answer questions such as if there is any ISP incident going on, which users and region (impacted region) is it affecting, and can a grade be associated with the type of incident. Further, the detection can help answer questions relating to the characteristics of the issue such as when did the issue start and end, what is the probability that a user connected to a certain ISP experiences an issue, and which services does the ISP downtime affect.

ISPs network architecture is extremely complex with peering relationships and hand-offs at various points. Broadly, ISPs are divided into a plurality of tiers. As the network is complex and distributed with a variety of devices, ISP outages of different scale and magnitude are common due to one or more causes. These causes can include technical problems (hardware failures, cable cuts, misconfigurations, bugs), catastrophic incidents (hurricanes, landslides, excessive rainfall), DDOS or other attacks by actions of malicious elements, business decisions by organizations involved in maintaining the internet infrastructure, geopolitical implications, and oversubscription of services as well as other causes of the like.

Figure 9:
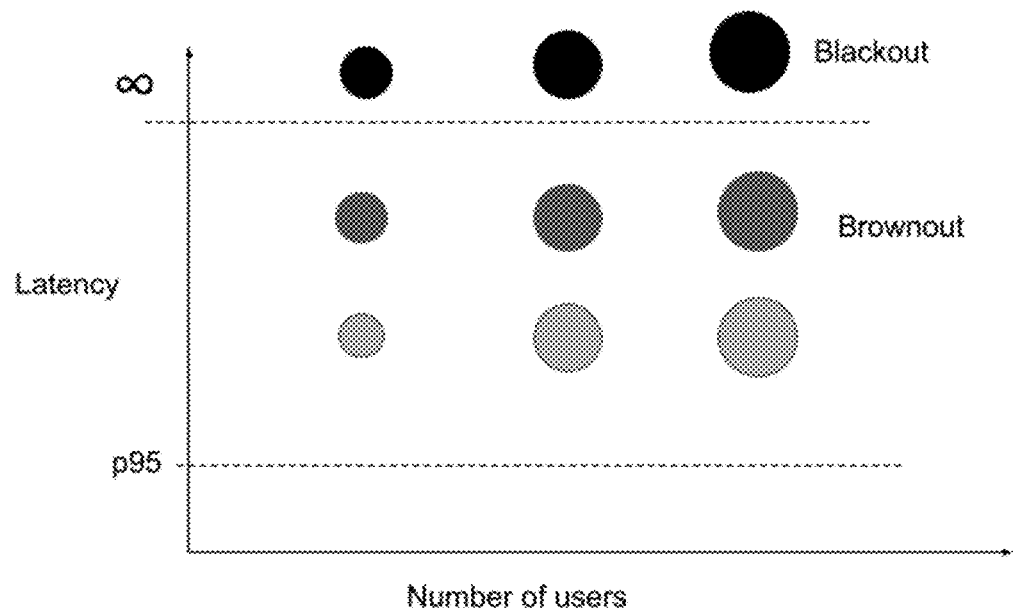
FIG. 9 is a graphical representation of the magnitude of a blackout or brownout in a network.

Outages or performance issues can broadly be classified into internet blackouts and internet brownouts. Internet blackouts can be defined as when an ISP connection completely fails, and users are unable to connect to the internet. Internet brownouts can be defined as significant latency or increased packet loss (reduced performance like slow page loads, high jitter audio/video etc.) or connection drops while accessing the internet, but are not completely off network. The magnitude of a blackout or brownout depends on the number of users affected, the duration, and resulting financial, business, or security impact. FIG. 9 illustrates the magnitude using the color coding and size of a circle. It will be appreciated that the magnitude of the of the impact can be graphically represented in any way known to one of ordinary skill in the art. Brownouts may be more common than blackouts, and are traditionally hard to detect.

Currently, blackouts or brownouts are detected through self-reporting by the affected users through social media (and other messaging platforms), or through specialized sites. However, this approach is not effective, as the majority of the blackouts and brownouts are not reported, and even if they are reported, it is difficult to estimate the scale and magnitude in terms of number of users, start and end times, and resulting financial, economic, and security impact.

Figure 10:
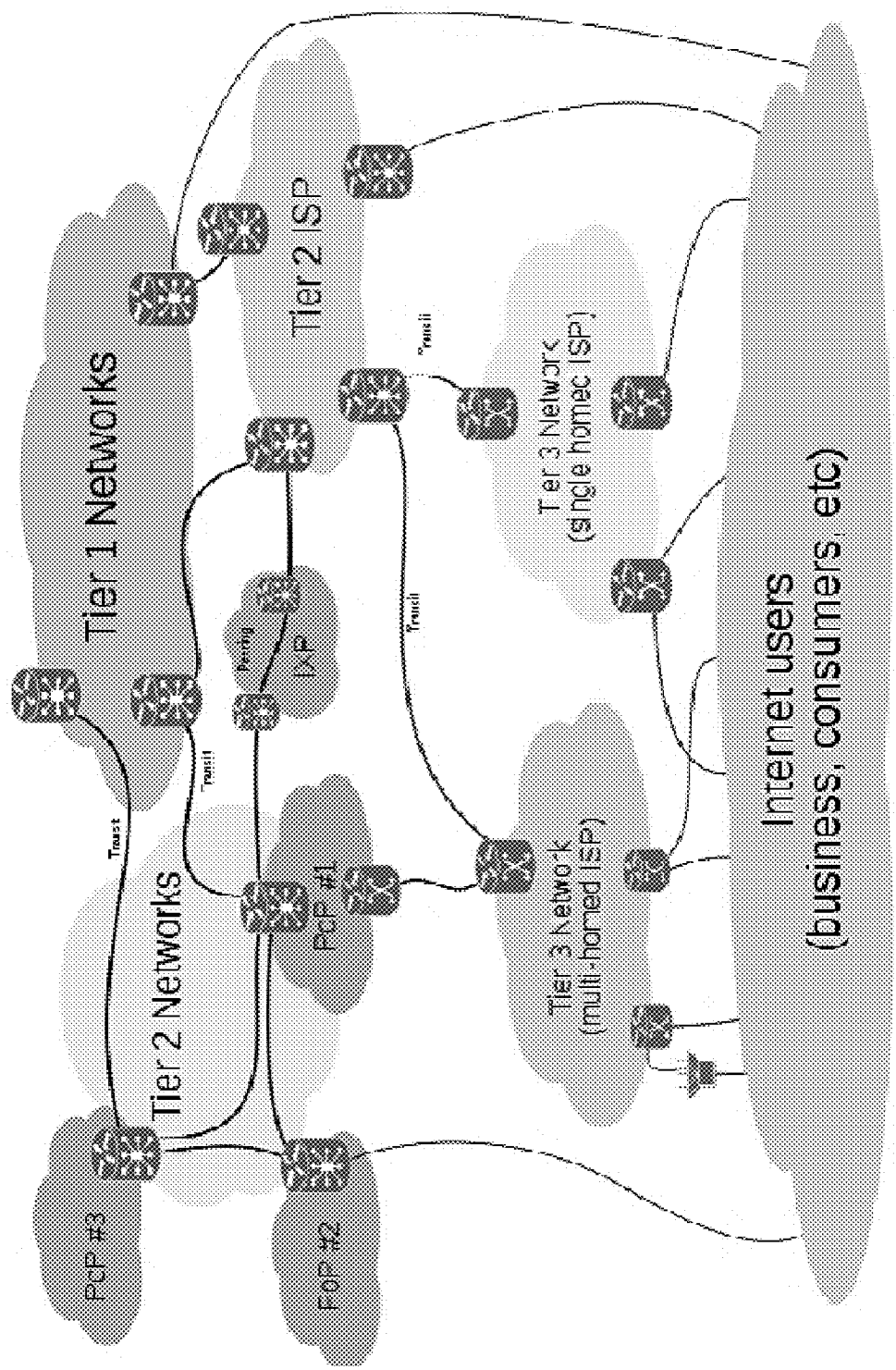
FIG. 10 is a network diagram of an Internet Service Provider (ISP) network architecture.

The proposed solution disclosed herein uses the telemetry data collected by the current system from millions of devices across the globe to assess the performance of all tiers of ISPs, and detect the blackouts and brownouts. Telemetry collected by the current system includes frequent/periodic traceroutes to popular destinations on the internet from millions of user devices across the globe, where user's devices are connected to all the ISPs across the various tiers as described in FIG. 10, and continuous monitoring of the network connection takes place. Telemetry collected by the current system additionally includes tracerouting between 160+ data centers (network edge locations) set up at strategic vantage points across the globe, capturing traffic patterns on the network (at configurable time periods), synthetic as well as real user monitoring/measurement by fetching various SaaS services, and subscribing to Border Gateway Protocol (BGP) route advertisements. BGP route changes indicate changes in the backbone either due to peering changes or backbone disruptions.

Outage magnitude is modeled as a function of telemetry signals along with other external data which includes but is not limited to BGP route announcements, and social network signals.

$$outage\_magnitude = f(telemetry\ signals, external\ signals)$$

Figure 11:
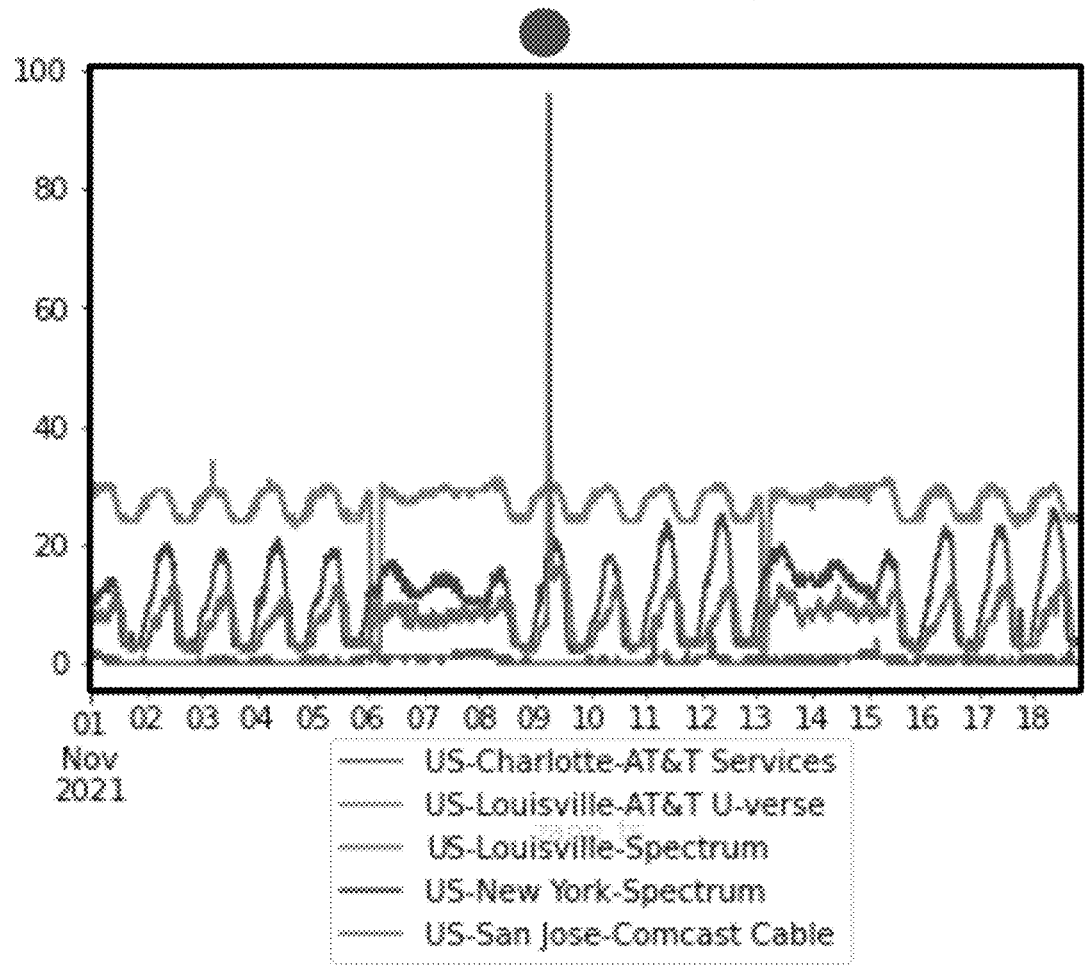
FIG. 11 is a graph showing regular probe error rates during a regular internet connection and during an outage.

Telemetry signals collected from every user's device include but are not limited to Page Fetch Time (PFT), Time To First Byte (TTFB), and the score assigned to the user as described above. These significantly worsen immediately after a blackout/brownout, which enables the system to proactively identify issues within minutes of an outage occurring, many times, even before the users realize it. Additional telemetry signals collected include hop visibility across traceroute and other measurements. Hop visibility spans home ISP to tier-2 and tier-3 networks (FIG. 10) with the latency, packet loss, and error rates at every hop. Changes in the collected metrics provide signals into outages. Typical probe error rates during a regular internet connection and during an outage can be seen in the example in FIG. 11.

§ 7.1 Internet Outage Detection Approaches

ISP baselining includes baselining the performance of ISPs on various metrics which include but are not limited to PFT, TTFB, probe error rates, latency, packet drops, and route stability. A model is trained to assess blackout/brownout prediction accuracy at different percentiles (performance values) for these metrics. Whenever the real time performance is worse than the percentile identified by the model, it is tagged as a blackout/brownout. Baselines are computed for different geo granularities, for example, locality, city, multi-cities, region, state etc. Geo granularities may use geo hashes. Impact/severity of the outage is proportional to the number of users affected, size of the geo hash, down time duration, and the like. An outage that affects a small group of people and is primarily associated with one geo-hash that represents a 5 mile radius is considered low impact, and that the outage is related to "last mile" (segment of the network from the user to the ISP access point) ISP issues. An outage that affects a large number of users of a geo-hash representing a 150 mile radius is considered more significant, and related to a "backbone/core" ISP incident.

As part of model training, baseline metrics are computed periodically, where the periods may be daily, weekly, or any longer/shorter time period. Brownouts/blackouts are detected by computing the distance of current metrics from baselines. Appropriate measures like thresholds are added to eliminate false positives.

Principal components of hops that define high latency nodes are identified by leveraging Principal Component Analysis (PCA) techniques. At every predetermined time interval, new incoming latency data feeds, aggregated at a geo-level, are projected on the principal components and the distance between original datapoint and projection matrix is calculated. If the distance is too high, the present system knows that the latest data feed is an anomaly and is marked as a potential outage. The magnitude of outage is determined by the number of users and spread of such users, to determine an outage.

§ 7.2 Internet Outage Detection Advanced AI/ML Techniques

A Machine Learning (ML) engine is a capability within the present internet outage detection system that finds the root cause of a bad experience. This can be used to generate the dataset where the ML engine detects network issues. Using these signals across many users along with data from prior ISP incidents, an advanced ML model will be trained. The present system employs each of inputs using various aspects related to users, network, topology, social media, news, search engine trends, etc. in addition to a combination of ML techniques to create a model. Various features utilized by the present system include user signals (application that the user uses, time, location, sensitivity to latency, etc.), middle boxes (type, make, model, performance, etc.), application (type of application, deployment location, etc.), social media signals, search engine trends (search keyword trends for "comcast outage", "internet outage", etc.), and others of the like.

Once a blackout/brownout is detected, to identify choke points within the network, ISP outage detectors will cluster latency and probe-errors based on different hops and ISPs within the network. The cluster with the highest centroid and above a certain minimum threshold is expected to be a leading indicator of a high-congestion zone (hops) and can be identified as the choke point in the network, triggering a blackout/brownout.

ISP blackout/brownout detection currently is a reactive approach, with very long lead times to diagnose and fix such issues, resulting in significant productivity loss for a wide customer base. The present solution helps to identify the issue near real time and over a period of time to predict outages, while also diagnosing what is responsible for it. ISPs will be able to fix the issues proactively and minimize the downtime. Additionally, ISP problems come in multiple shapes and sizes. Since the systems and methods herein are analyzing across multiple geography levels, timeframes, and outage types, it is able to capture a diverse set of ISP outages. Variation of this approach could be used to detect blackouts and brownouts in server farms offering a cloud hosted service delivered from multiple data centers.

§ 7.3 Internet Outage Detection Process

Figure 12:
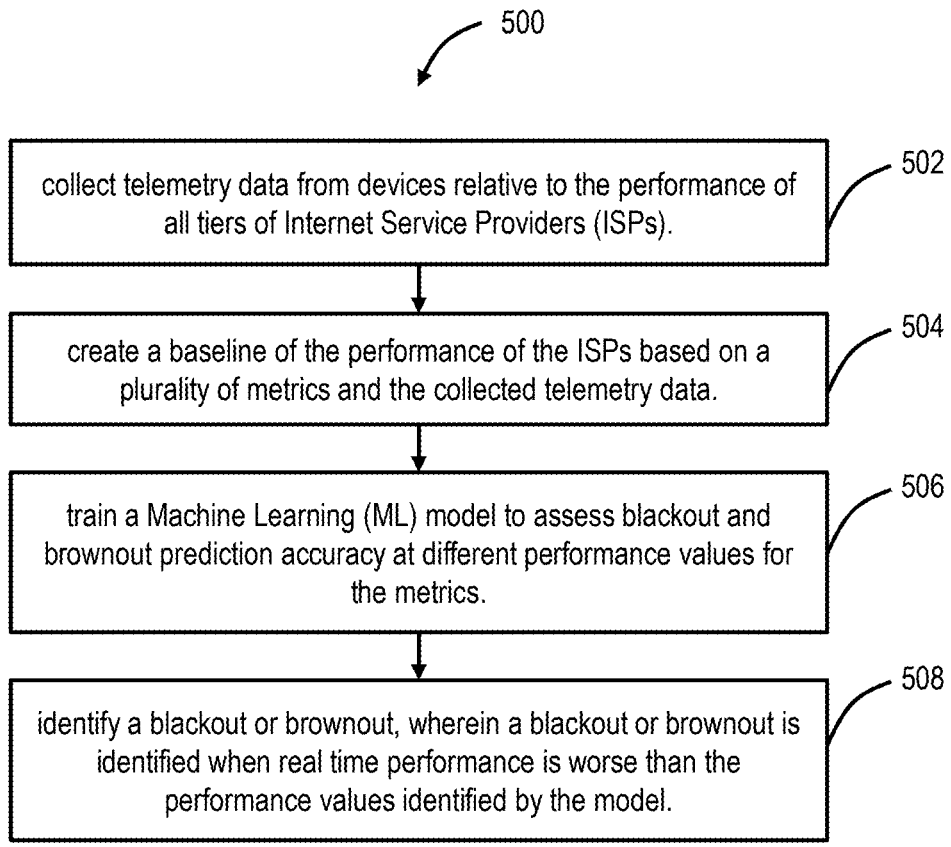
FIG. 12 is a flow diagram of a internet outage detection method of the present disclosure.

The present systems and methods provide a user performance monitoring solution that enables the monitoring of application and device performance from the end user's point of view. FIG. 12 is a flow diagram of the internet outage detection method 500 of the present disclosure. The present systems and methods help Information Technology (IT) personnel to ensure the quality of digital experience across the enterprise. The present system is adapted to collect telemetry data 502 from devices relative to the performance of all tiers of Internet Service Providers (ISPs), create a baseline 504 of the performance of the ISPs based on a plurality of metrics and the collected telemetry data, train a Machine Learning (ML) model 506 to assess blackout and brownout prediction accuracy at different performance values for the metrics, and identify a blackout or brownout 508, wherein a blackout or brownout is identified when real time performance is worse than the performance values identified by the model.

The telemetry data may include traceroutes to popular destinations, and the traceroutes may also be performed between data centers set up at strategic locations. The various metrics utilized to train the ML model can include Page Fetch Time (PFT), Time To First Byte (TTFB), probe error rates, latency, packet drops, route stability, and other metrics of the like. A magnitude of the blackout or brownout is calculated as a function of the telemetry signals along with external data. The magnitude of the blackout or brownout may be represented in graphical form. A blackout or brownout that affects a small group of people is considered low impact and is related to user to access point ISP issues, and an outage that affects a large number of users is considered more significant, and related to a backbone ISP incident. Baseline metrics can further be computed periodically, where the periods may be daily, weekly, or any longer or shorter time period. Blackouts and brownouts are detected by computing the distance of current metrics from baselines. Once a blackout or brownout is detected, to identify choke points within a network, ISP outage detectors will cluster latency and probe-errors based on different hops and ISPs within the network.

§ 8.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause a processor to
receive, at a cloud-based system, telemetry data from a plurality of connector applications associated with a plurality of user devices, wherein the telemetry data is collected at the plurality of connector applications, the telemetry data being relative to performance of all tiers of Internet Service Providers (ISPs) from a point of view of the plurality of user devices;
generate baselines of the performance of the ISPs based on a plurality of metrics and the collected telemetry data, wherein the baselines are generated over a plurality of geo granularities;
train a Machine Learning (ML) model to assess blackout and brownout prediction accuracy at different performance values for the metrics; and
identify a blackout or brownout and determine a severity of the blackout or brownout, wherein the blackout or brownout is identified when real time performance is worse than the performance baselines identified by the model, and wherein the severity of the blackout or brownout is based on a number of users affected and a geographic size of an affected area.

2. The non-transitory computer-readable medium of claim 1, wherein blackouts and brownouts are detected by computing distance of current metrics from baselines.

3. The non-transitory computer-readable medium of claim 1, wherein the collecting telemetry data comprises performing traceroutes from the plurality of user devices to frequently visited destinations.

4. The non-transitory computer-readable medium of claim 3, wherein the traceroutes are performed between data centers set up across geographic locations.

5. The non-transitory computer-readable medium of claim 1, wherein the plurality of metrics comprise Page Fetch Time (PFT), Time To First Byte (TTFB), probe error rates, latency, packet drops, and route stability.

6. The non-transitory computer-readable medium of claim 1, wherein a blackout or brownout is considered related to user to access point ISP issues, or to a backbone ISP incident based on the number of users affected.

7. The non-transitory computer-readable medium of claim 1, wherein baseline metrics are computed periodically, where the periods may be daily, weekly, or any longer or shorter time period.

8. A method implemented external to a network edge and located external from one of a computer device and a mobile device associated with a user, the method comprising steps of:
receiving, at a cloud-based system, telemetry data from a plurality of connector applications associated with a plurality of user devices, wherein the telemetry data is collected at the plurality of connector applications, the telemetry data being relative to performance of all tiers of Internet Service Providers (ISPs) from a point of view of the plurality of user devices;
generating baselines of the performance of the ISPs based on a plurality of metrics and the collected telemetry data, wherein the baselines are generated over a plurality of geo granularities;
training a Machine Learning (ML) model to assess blackout and brownout prediction accuracy at different performance values for the metrics; and
identifying a blackout or brownout and determining a severity of the blackout or brownout, wherein the blackout or brownout is identified when real time performance is worse than the performance baselines identified by the model, and wherein the severity of the blackout or brownout is based on a number of users affected and a geographic size of an affected area.

9. The method of claim 8, wherein blackouts and brownouts are detected by computing distance of current metrics from baselines.

10. The method of claim 8, wherein the collecting telemetry data comprises performing traceroutes from the plurality of user devices to frequently visited destinations.

11. The method of claim 10, wherein the traceroutes are performed between data centers set up across the geographic locations.

12. The method of claim 8, wherein the plurality of metrics comprise Page Fetch Time (PFT), Time To First Byte (TTFB), probe error rates, latency, packet drops, and route stability.

13. The method of claim 8, wherein a blackout or brownout is considered related to user to access point ISP issues, or to a backbone ISP incident based on the number of users affected.

14. The method of claim 8, wherein baseline metrics are computed periodically, where the periods may be daily, weekly, or any longer or shorter time period.

15. A method implemented external to a network edge and located external from one of a computer device and a mobile device associated with a user, the method comprising steps of:
   receiving, at a cloud-based system, telemetry data from a plurality of connector applications associated with a plurality of user devices, wherein the telemetry data is collected at the plurality of connector applications, the telemetry data being relative to performance of all tiers of Internet Service Providers (ISPs) from a point of view of the plurality of user devices;
   generating baselines of the performance of the ISPs based on a plurality of metrics and the collected telemetry data, wherein the baselines are generated over a plurality of geo granularities; and
   training a Machine Learning (ML) model to assess blackout and brownout prediction accuracy at different performance values for the metrics, wherein a magnitude of a blackout or brownout is calculated as a function of the telemetry data and external data, wherein the external data includes social media and search engine keyword trends, and wherein the telemetry data is a function of Page Fetch Time (PFT), Time To First Byte (TTFB), and a score assigned to users of the plurality of user devices.

16. The method of claim 15, wherein the collecting telemetry data comprises performing traceroutes from the plurality of user devices to frequently visited destinations.

17. The method of claim 15, wherein the plurality of metrics comprise Page Fetch Time (PFT), Time To First Byte (TTFB), probe error rates, latency, packet drops, and route stability.

18. The method of claim 15, wherein the magnitude of the blackout or brownout is represented in graphical form.

19. The method of claim 15, wherein a blackout or brownout is considered related to user to access point ISP issues, or to a backbone ISP incident based on the number of users affected.

20. The method of claim 15, wherein baseline metrics are computed periodically, where the periods may be daily, weekly, or any longer or shorter time period.

\* \* \* \* \*